(12) United States Patent
Ben-Rubi

(10) Patent No.: US 12,105,574 B2
(45) Date of Patent: Oct. 1, 2024

(54) DATA STORAGE WITH REAL TIME DYNAMIC CLOCK FREQUENCY CONTROL

(71) Applicant: Western Digital Technologies, Inc., San Jose, CA (US)

(72) Inventor: Refael Ben-Rubi, Rosh Haayin (IL)

(73) Assignee: Sandisk Technologies, Inc., Milpitas, CA (US)

( * ) Notice: Subject to any disclaimer, the term of this patent is extended or adjusted under 35 U.S.C. 154(b) by 116 days.

(21) Appl. No.: 17/729,854

(22) Filed: Apr. 26, 2022

(65) Prior Publication Data

US 2023/0341921 A1 Oct. 26, 2023

(51) Int. Cl.
| | |
|---|---|
| *G06F 1/3234* | (2019.01) |
| *G06F 1/08* | (2006.01) |
| *G06F 1/3203* | (2019.01) |
| *G06F 1/3221* | (2019.01) |
| *G06F 1/3225* | (2019.01) |
| *G06F 1/324* | (2019.01) |
| *G06F 3/06* | (2006.01) |
| *G06F 9/54* | (2006.01) |
| *G06F 11/34* | (2006.01) |

(52) U.S. Cl.
CPC ............ *G06F 1/3268* (2013.01); *G06F 1/324* (2013.01); *G06F 1/08* (2013.01); *G06F 1/3203* (2013.01); *G06F 1/3221* (2013.01); *G06F 1/3225* (2013.01); *G06F 1/3275* (2013.01); *G06F 3/0625* (2013.01); *G06F 3/0656* (2013.01); *G06F 9/546* (2013.01); *G06F 11/3409* (2013.01)

(58) Field of Classification Search
CPC ...... G06F 1/3203; G06F 1/324; G06F 1/3275; G06F 1/3268; G06F 3/0656; G06F 1/08; G06F 3/0625; G06F 1/3225; G06F 1/3221; G06F 11/3409; G06F 9/546
USPC .................................. 713/300, 322; 710/52
See application file for complete search history.

(56) References Cited

U.S. PATENT DOCUMENTS

| | | | |
|---|---|---|---|
| 8,862,806 B2 | 10/2014 | Yoon et al. | |
| 9,152,214 B2 | 10/2015 | Thumma | |
| 9,804,790 B2 | 10/2017 | Park et al. | |
| 10,514,748 B2 | 12/2019 | Tidwell et al. | |
| 10,534,546 B2 | 1/2020 | Benisty et al. | |
| 2008/0189569 A1* | 8/2008 | Chu | G06F 1/3203 718/100 |
| 2010/0262971 A1* | 10/2010 | Yamada | G06F 9/505 718/104 |
| 2012/0324248 A1* | 12/2012 | Schluessler | G06F 1/329 713/300 |
| 2013/0104124 A1* | 4/2013 | Tsirkin | G06F 9/45558 718/1 |
| 2019/0179547 A1 | 6/2019 | Szubbocsev | |

(Continued)

*Primary Examiner* — Ji H Bae
(74) *Attorney, Agent, or Firm* — PATTERSON + SHERIDAN, LLP; Steven H. VerSteeg

(57) ABSTRACT

The present disclosure generally relates to ensuring a data storage device consumes as little power as possible. Different HW modules in the data storage device can operate at different frequencies to ensure any bottleneck HW modules operate at as fast a frequency as possible, while non-bottleneck HW modules operate at slower frequencies and hence, consume less power. The frequency for each HW modules is dynamic and is adjusted based upon detected bottlenecks so that the data storage device can operate as efficiently as possible and consume as little power as possible.

17 Claims, 5 Drawing Sheets

(56) References Cited

U.S. PATENT DOCUMENTS

2020/0401384 A1* 12/2020 Lee ................... G06F 9/4401
2021/0141559 A1*  5/2021 Kim ................... G06F 3/0613
2022/0317747 A1* 10/2022 Choi .................. G06F 1/324

* cited by examiner

DATA STORAGE WITH REAL TIME DYNAMIC CLOCK FREQUENCY CONTROL

BACKGROUND OF THE DISCLOSURE

Field of the Disclosure

Embodiments of the present disclosure generally relate to ensuring a data storage device works at highest performance and without bottlenecks while consuming as little power as possible.

Description of the Related Art

Solid state drives (SSDs) comprise a memory device and a controller coupled to the memory device. The SSD, and in particular the controller, comprises numerous hardware (HW) modules. Example HW modules include the flash interface module (FIM), the host interface module (HIM), the low density parity check (LDPC) module, the main central processing unit (CPU), the data path CPU, the low level flash sequencer (LLFS), as well as others.

Each HW module works at a certain clock frequency and consumes a certain amount of power. The amount of power consumed depends upon the clock frequency. When the clock frequency is high, the consumed power is high. Conversely, when the clock frequency is low, the consumed power is low.

When a module is not in use, the module will still consume power. It is possible to turn off the HW module when not in use, but there is a penalty for turning off the HW module. When the HW module is needed, the amount of time necessary to be ready to resume operations, and hence power to prep the HW module, may more than offset the power savings of turning off the HW module. Therefore, HW modules typically remain on. Most of the time, the HW modules consume much more power than actually used due to the HW module being idle.

Therefore, there is a need in the art for ensuring the various HW modules consume as little power as possible.

SUMMARY OF THE DISCLOSURE

The present disclosure generally relates to ensuring a data storage device consumes as little power as possible. Different HW modules in the data storage device can operate at different frequencies to ensure any bottleneck HW modules operate at as fast a frequency as possible, while non-bottleneck HW modules operate at slower frequencies and hence, consume less power. The frequency for each HW modules is dynamic and is adjusted based upon detected bottlenecks so that the data storage device can operate as efficiently as possible and consume as little power as possible.

In one embodiment, a data storage device comprises: a memory device; and a controller coupled to the memory device, wherein the controller is configured to: identify a bottleneck in one or more hardware (HW) modules of a plurality of HW modules, wherein each HW module of the plurality of HW modules operates at a clock frequency, and wherein the clock frequency is dynamic for each HW module; change the clock frequency of at least one HW module of the plurality of modules; and monitor the plurality of HW modules for bottleneck issues.

In another embodiment, a data storage device comprises: a memory device; and a controller coupled to the memory device, wherein the controller is configured to: determine a number of messages pending in an input queue of a plurality of hardware (HW) modules and determine which HW module has the smallest amount of messages in the input queue; set a clock frequency for a first HW module of the plurality of HW modules to a first clock frequency setting; set a clock frequency for a second HW module of the plurality of HW modules to a second clock frequency setting, wherein the second clock frequency setting lower than the first clock frequency setting; and repeating the determining, the setting, and the setting, wherein the repeating occurs after a predetermined period of time.

In another embodiment, a data storage device comprises: memory means; and a controller coupled to the memory means, wherein the controller is configured to: dynamically change a clock frequency of one or more hardware (HW) modules of a plurality of HW modules based upon detected bottlenecking in the plurality of HW modules; and monitoring a number of messages in an input queue of each HW module of the plurality of HW modules.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to ensuring a data storage device consumes as little power as possible. Different HW modules in the data storage device can operate at different frequencies to ensure any bottleneck HW modules operate at as fast a frequency as possible, while non-bottleneck HW modules operate at slower frequencies and hence, consume less power. The frequency for each HW modules is dynamic and is adjusted based upon detected bottlenecks so that the data storage device can operate as efficiently as possible and consume as little power as possible.

Figure 1:
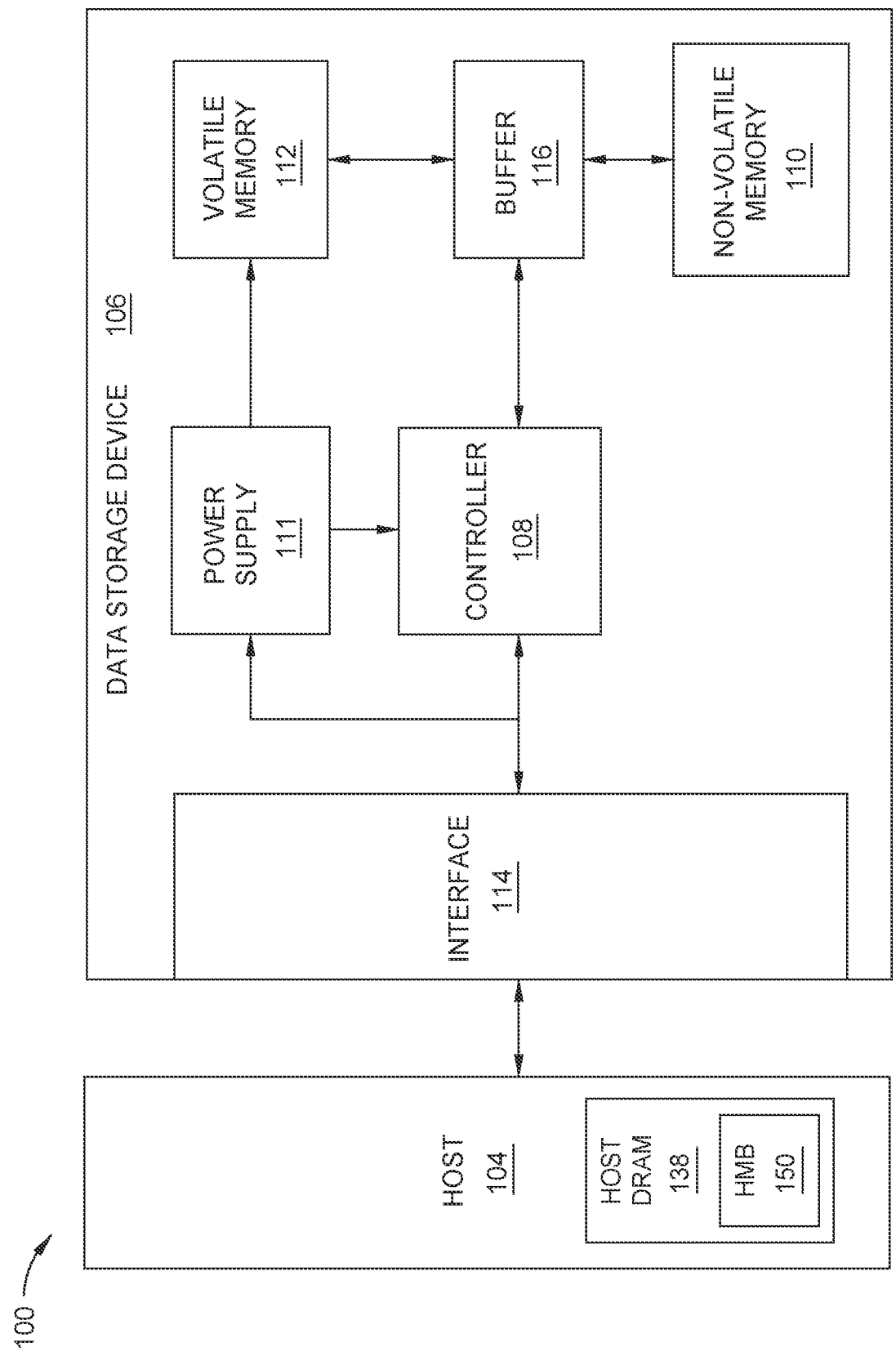
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. The host DRAM 138 includes a host memory buffer (HMB) 150. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Furthermore, the controller 108 may store data and retrieve data from the HMB 150. The HMB 150 is a portion of the host DRAM 138 that is apportioned for use by the controller 108 without host device 104 interaction. For example, the HMB 150 may be used to store data normally stored in an internal RAM, such as SRAM or DRAM. In other examples, the controller 108 may store data in the HMB 150 during a shutdown operation such that the data may not be lost due to flushing of the volatile memory 112. Furthermore, latency of accessing and retrieving data from the HMB 150 may be quicker than accessing and retrieving data of the NVM 110, such that the controller 108 may program data to the HMB 150 during the operation of the data storage device 106 and commit the data that is programmed to the HMB 150 to the NVM 110 at certain points during the operation of the data storage device 106.

In NVMe protocol, the HMB 150 may be accessed by the controller 108 when the data storage device 106 is in a low power mode. For example, if the controller 108 indicates support for the HMB Prohibit Non-Operational Access (NAP) in the Controller Attributes (CTRATT) field in the Identify Controller data structure and the NAP bit is set to '1' (disabled), then the controller 108 may access the HMB 150 while processing a command submitted to the Admin Submission Queue. However, when the Non-Operational Access Prohibit is enabled, the controller 108 may not access the HMB 150 in order to perform controller-initiated activity, such as an activity not directly associated with a host command. It is to be understood that the previously listed example is not intended to be limiting, but to provide an example of a possible embodiment.

Figure 2:
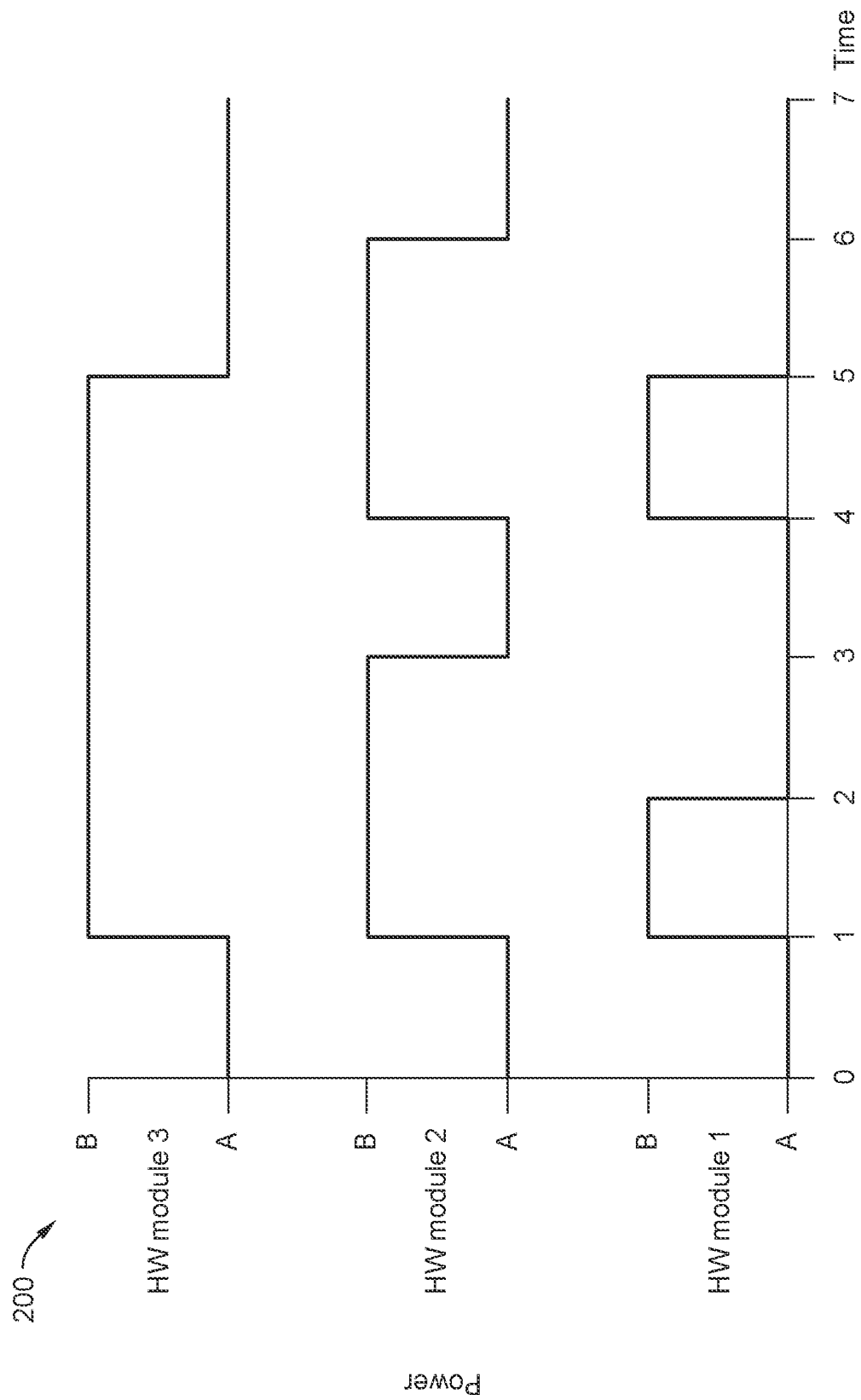
FIG. 2 is a graph illustrating power versus time for several HW modules operating at the same clock frequency.

FIG. 2 is a graph 200 illustrating power versus time for several HW modules operating at the same clock frequency. FIG. 2 shows the power versus time for three HW modules: HW module 1, HW module 2, and HW module 3. At time 0, all HW modules are at level A of power.

For HW module 1, at time 1, the power needed is at level B. The power needed remains constant from time 1 through time 2 and then decreases to level A at time 2 through time 4. At time 4, the power needed increases back to level B through time 5 and then decreases at time 5 back to level A through time 7. For HW module 2, at time 1, the power needed is at level B and remains at level B to time 3 and then decreases at time 3 to level A to time 4. At time 4, the power needed increases again to level B and remains at level B through time 6. At time 6, the power needed reduces to level A through time 7. For HW module 3, at time 1, the power needed is at level B through time 5. At time 5, the power needed decreases to level A through time 7.

In FIG. 2, all of the HW modules are operating at the same clock frequency. Hence, HW module 2 is a bottleneck compared to HW module 1. Similarly, HW module 3 is a bottleneck compared to HW modules 1 and 2. One manner to deal with the bottleneck is to increase the clock frequency of the bottleneck HW modules. Another manner to deal with the bottleneck is to decrease the clock frequency of the non-bottleneck HW modules. Hence, different HW modules having different power needs can operate at different clock frequencies.

In order to determine how to adjust the clock frequency for HW modules, the various HW modules are analyzed. Specifically, each HW modules is analyzed and the clock frequency for each HW module can be changed as needed. For example, in each state of the system, firmware (FW) may identify the current bottleneck of the system. The identification can occur by checking a number of messages that current exist in the input queue of each HW module. If the number of messages that current exists in the input queue of a specific HW module is not zero, and additionally, the handling time of one flash memory unit (FMU) of approximately 4 KB by the specific HW module is the slowest compared to all other HW modules having non-zero number of messages, then the specific HW module is the current bottleneck. It is important to note that in the very near future (e.g., 5 seconds), the specific HW module may no longer be the bottleneck as the specific HW module may have zero messages in the input queue and a different HW module may be selected as the new bottleneck.

Another method to determine which HW module is the bottleneck is to coordinate based upon the number of messages and the amount of time to process the messages. For example, for each HW module, multiply the number of messages in the input queue waiting to be processed by the processing time for each message. It should be noted that each HW module may have a different sized input queue and/or a different processing time for each message. The product of the number of messages times the processing time for each HW module is compared, and the largest number is the bottleneck. Examples of processing times for messages are 1 or 2 microseconds for LDPC modules and 5 microseconds for a HIM.

The clock frequency of the specific module that is the bottleneck will be set to the highest possible clock frequency. The clock frequency of any HW module that works with the specific HW module that is the bottleneck will also be set to the highest clock frequency possible. Such modules may be referred to as sub-modules. One such example is a LDPC module works with a direct memory access (DMA) module. The mapping between HW modules and the other modules that work together is information that is gathered at the development/simulation stage and inserted into FW code as, for example, a table.

The clock frequency of all other HW modules (i.e., modules other than the bottleneck and related HW modules) will be set dynamically to a lower clock frequency. The percentage of decrease of clock frequency from the maximum clock frequency (i.e., clock frequency used by bottleneck HW module) will be determined according to the relationship between the current amount of messages in the input queue divided by the maximum number of messages allowed in that specific input queue, which is related to the maximum expected activity. For example, if the FIM module permits a maximum of ten messages in the input queue and currently has five messages in the input queue, then a good value for the percentage decrease of clock frequency from the maximum clock frequency is $5/10$ or $1/2$ of the maximum clock frequency. After a predetermined period of time, the process is repeated.

Figure 3:
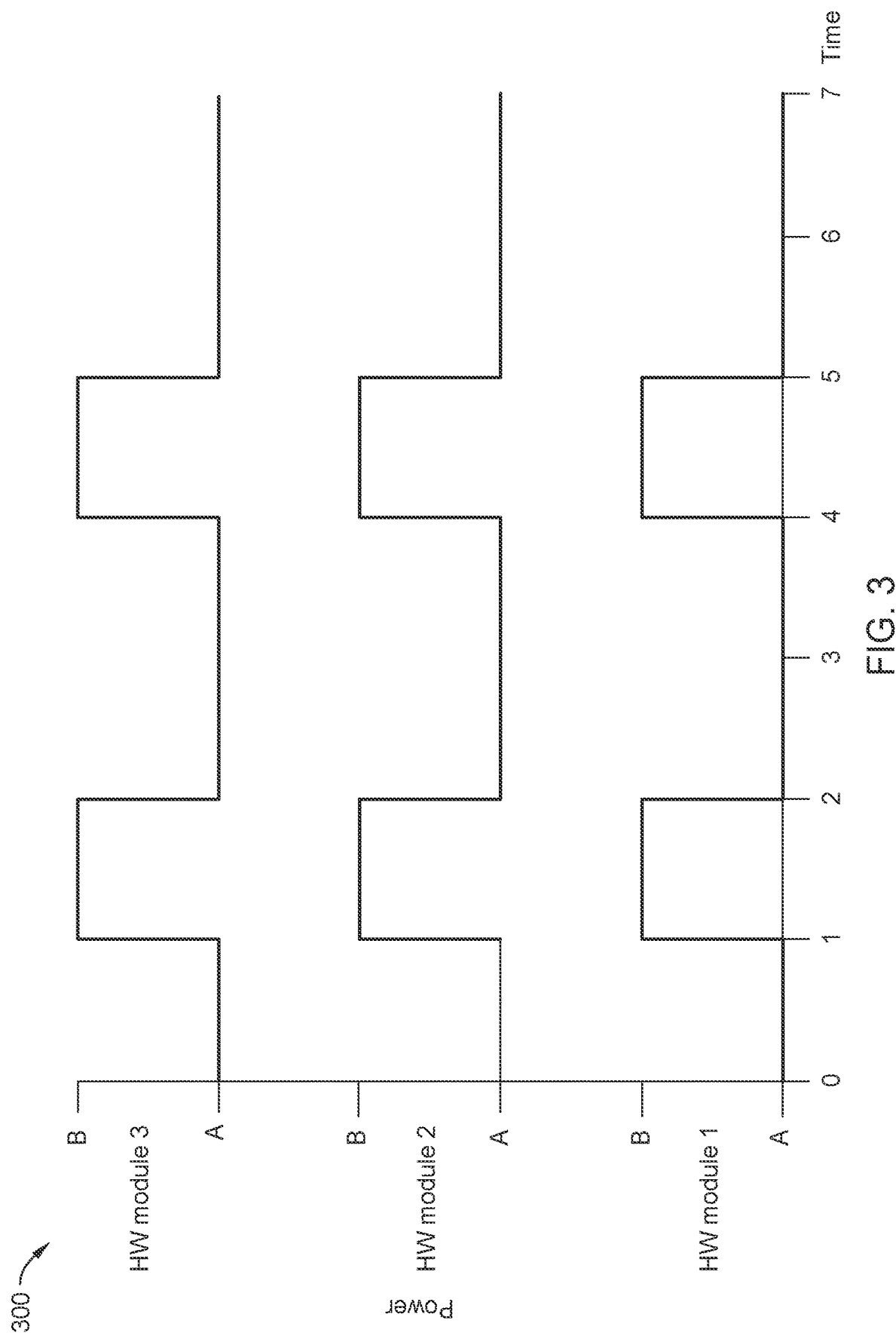
FIG. 3 is a graph illustrating power versus time for several HW modules operating at different clock frequencies.

FIG. 3 is a graph 300 illustrating power versus time for several HW modules operating at different clock frequencies. As shown in FIG. 3, the clock frequencies have been adjusted such that HW module 1, HW module 2, and HW module 3 all operate at different clock frequencies and hence, utilize the minimum amount of power consumption. For example, the HW module 3 may have been set to a maximum clock frequency that is four times the clock frequency of HW module 1 and HW module 2 may have been set to a greater clock frequency which is twice the clock frequency of HW module 1. In such an example, there is no longer a bottleneck. It is contemplated that rather than increasing the clock frequency of HW modules 2 and 3, the clock frequency of HW modules 1 and 2 can be decreased. Furthermore, it is contemplated that a mixture of increasing and decreasing clock frequencies for HW modules 1-3 can be utilized to obtain the minimum power consumption.

Figure 4:
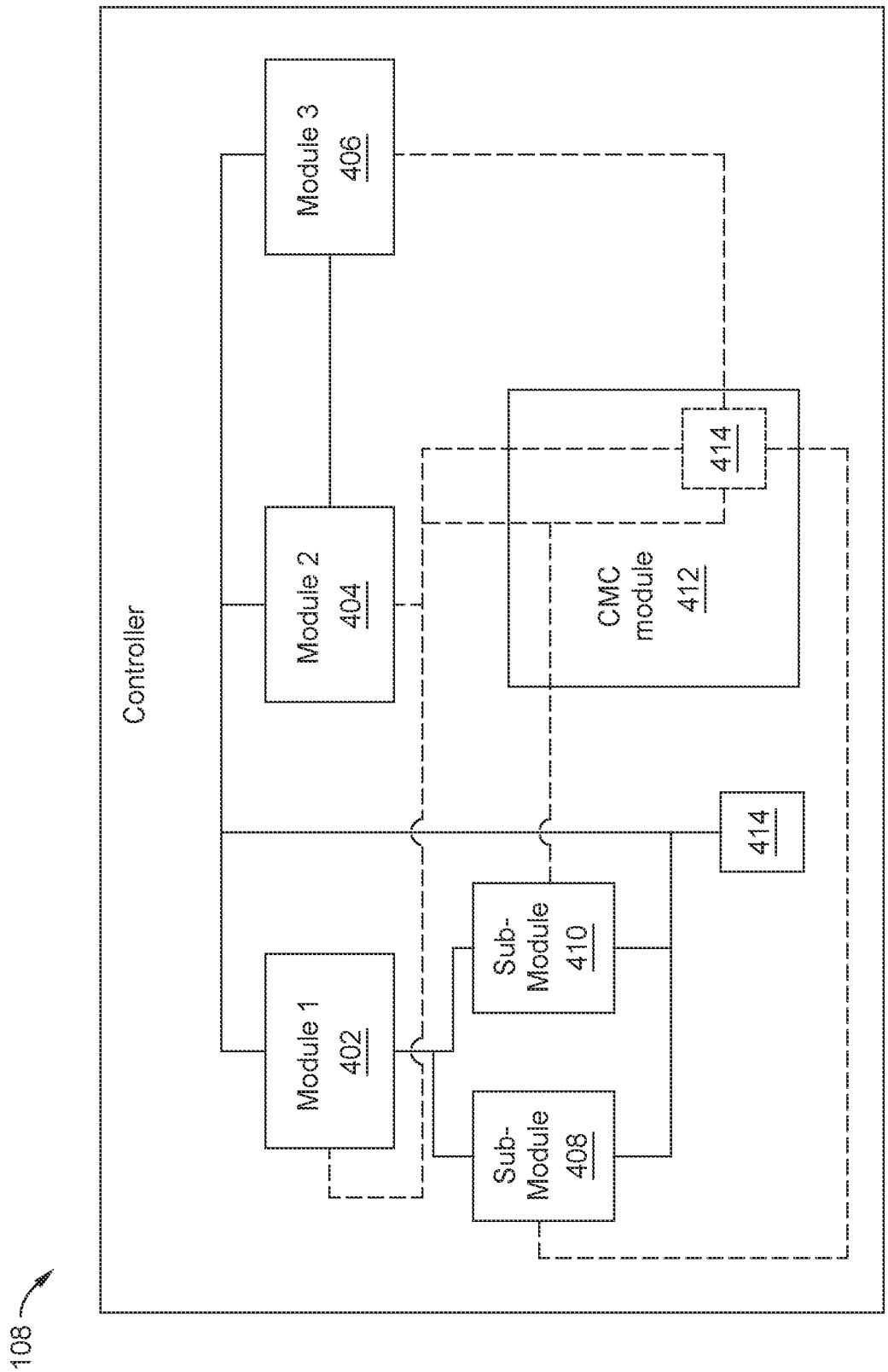
FIG. 4 is a schematic illustration of a controller according to one embodiment.

FIG. 4 is a schematic illustration of a controller 108 according to one embodiment. In FIG. 4, three HW modules are shown: HW module 1 402, HW module 2 404, and HW module 3 406. Additionally, two sub-modules 408, 410 are shown. The two sub-modules 408, 410 work closely with HW module 1 and are hence shown as connected thereto. The two sub-modules 408, 410 should operate at the clock frequency as HW module 1 402. The other HW modules 404, 406 may operate at the same or different clock frequency from HW module 1 402 depending upon bottleneck calculations. The controller 108 also includes a clock management controller (CMC) 412. Because of the real time nature of the clock frequency determination, the preferred implementation is in a HW based clock frequency adjustment module 414. The clock frequency adjustment module 414 receives inputs from each HW module 402, 404, 406 and sub-modules 408, 410 and generates as output changes of clock frequency for the respective HW modules 402, 404, 406 and sub-modules 408, 410. The input may be the number of messages in the input queues for each module 402, 404, 406 and/or sub-module 408, 410. The clock frequency adjustment module 414 may be disposed in the CMC 412 as shown in dashed lines or be independent of the CMC 412 as shown in FIG. 4 in solid lines. It is also contemplated that FW may be used instead of the clock frequency adjustment module 414, but FW may have slower implementation due to the existence of operating systems that do not switch between tasks and hence, limits control over clock frequencies.

Figure 5:
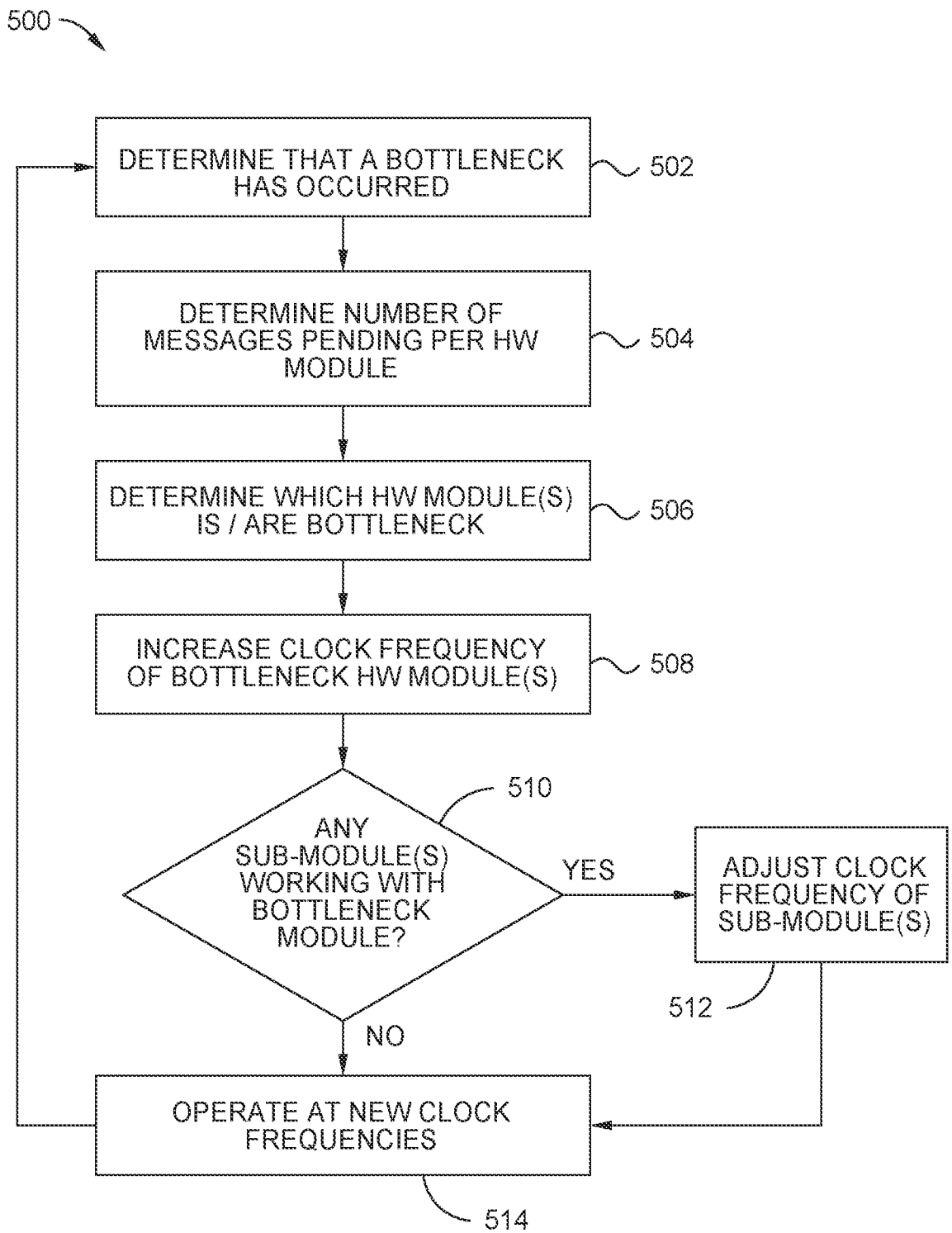
FIG. 5 is a flowchart illustrating changing clock frequency according to one embodiment.

FIG. 5 is a flowchart 500 illustrating changing clock frequency according to one embodiment. Initially, a bottleneck is detected at 502. Once the bottleneck is detected, the number of messages in the input queue of each HW module is determined at 504, and which HW module or modules that is/are the bottleneck is determined at 506. The clock frequency is increased at 508 for the bottleneck HW module(s). A determination is made regarding whether there are any sub-modules that work with the determined bottleneck module(s) at 510. If there are such sub-modules, the clock frequency of those sub-modules is adjusted at 512 to match the new clock frequency of the determined bottleneck module(s). Thereafter, the system is operated at the new clock frequencies at 514. If there are no sub-modules that work with the determined bottleneck module at 512, then the system operates at the new clock frequency at 514. As the system is dynamic, the entire process repeats at 502.

By dynamically adjusting the frequency of one or more HW modules in the data storage device, the data storage device will always operate using the minimum power consumption possible. Bottlenecks are detected so that the frequency can be adjusted for the various HW modules.

In one embodiment, a data storage device comprises: a memory device; and a controller coupled to the memory device, wherein the controller is configured to: identify a bottleneck in one or more hardware (HW) modules of a plurality of HW modules, wherein each HW module of the plurality of HW modules operates at a clock frequency, and wherein the clock frequency is dynamic for each HW module; change the clock frequency of at least one HW module of the plurality of modules; and monitor the plurality of HW modules for bottleneck issues. Changing the clock frequency comprises increasing the clock frequency of a first HW module of the plurality of HW modules. Changing the clock frequency comprises decreasing the clock frequency of a second HW module of the plurality of HW modules. Identifying the bottleneck comprises identifying which HW module of the plurality of HW modules has a highest number of messages in an input queue of the respective HW module. The controller is further configured to change the clock frequency of the at least one HW module after the monitoring. A changed clock frequency of a first HW module matches a changed clock frequency of a second HW module. For a HW module of the plurality of HW modules, a percentage change in clock frequency is equal to a ratio of a current amount of messages in an input queue divided by a maximum number of messages permitted in the input queue. Identifying the bottleneck comprises identifying which HW module of the plurality of HW modules has a slowest handling time of one flash memory unit (FMU). Identifying the bottleneck comprises identifying which HW module of the plurality of HW modules has a highest number of a product of a number messages in an input queue of the respective HW module times a processing time for each message in the input queue. The controller is further configured to repeat the identifying, changing, and monitoring.

In another embodiment, a data storage device comprises: a memory device; and a controller coupled to the memory device, wherein the controller is configured to: determine a number of messages pending in an input queue of a plurality of hardware (HW) modules and determine which HW module has the smallest amount of messages in the input queue; set a clock frequency for a first HW module of the plurality of HW modules to a first clock frequency setting; set a clock frequency for a second HW module of the plurality of HW modules to a second clock frequency setting, wherein the second clock frequency setting lower than the first clock frequency setting; and repeating the determining, the setting, and the setting, wherein the repeating occurs after a predetermined period of time. The controller is further configured to determine a handling time for each message for each HW module of the plurality of HW modules. The controller is further configured to determine a product of the number of messages and the handling time for each operation requested by the message. The first HW module is a HW module with a highest product compared to all other HW modules of the plurality of HW modules. The second HW module is a HW module with a lowest product compared to all other HW modules of the plurality of HW modules. Setting the clock frequency for the second HW module comprises lowering the clock frequency by a percentage of the clock frequency from the clock frequency of the first HW module that is defined as a current number of messages in the input queue divided by a total number of messages permitted in the input queue. The controller comprises a clock management controller (CMC) and wherein the CMC is configured to perform the determining, the setting, the setting, and the repeating.

In another embodiment, a data storage device comprises: memory means; and a controller coupled to the memory means, wherein the controller is configured to: dynamically change a clock frequency of one or more hardware (HW) modules of a plurality of HW modules based upon detected bottlenecking in the plurality of HW modules; and monitoring a number of messages in an input queue of each HW module of the plurality of HW modules. The controller further comprises a bottleneck module for performing the dynamically changing and the monitoring. The dynamically changing comprises increasing the clock frequency of a slowest HW module of the plurality of HW modules and another HW module of the plurality of HW modules.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller comprises a processor programmed to:
identify a bottleneck in one or more hardware (HW) modules of a plurality of HW modules, wherein each HW module of the plurality of HW modules operates at a clock frequency, and wherein the clock frequency is dynamic for each HW module;
change the clock frequency of at least one HW module of the plurality of HW modules, wherein changing the clock frequency comprises:
increasing the clock frequency of a first HW module of the plurality of HW modules; and
setting the clock frequency of a second HW module of the plurality of HW modules to match the changed clock frequency of the first HW module, wherein the second HW module is a sub-module of the first HW module; and
monitor the plurality of HW modules for bottleneck issues.

2. The data storage device of claim 1, wherein changing the clock frequency further comprises decreasing the clock frequency of a third HW module of the plurality of HW modules.

3. The data storage device of claim 1, wherein identifying the bottleneck comprises identifying which HW module of the plurality of HW modules has a highest number of messages in an input queue of each HW module of the plurality of HW modules.

4. The data storage device of claim 1, wherein the processor is further programmed to change the clock frequency of the at least one HW module after the monitoring.

5. The data storage device of claim 1, wherein the processor is further programmed to repeat the identifying, changing, and monitoring.

6. A data storage device, comprising:
a memory device; and
a controller coupled to the memory device, wherein the controller comprises a processor programmed to:
identify a bottleneck in one or more hardware (HW) modules of a plurality of HW modules, wherein each HW module of the plurality of HW modules operates at a clock frequency, and wherein the clock frequency is dynamic for each HW module;
change the clock frequency of at least one HW module of the plurality of HW modules, wherein, for a HW module of the plurality of HW modules, a percentage change in the clock frequency is equal to a ratio of a current amount of messages in an input queue divided by a maximum number of messages permitted in the input queue; and
monitor the plurality of HW modules for bottleneck issues.

7. A data storage device, comprising:
a memory device; and
a controller coupled to the memory device, wherein the controller comprises a processor programmed to:
identify a bottleneck in one or more hardware (HW) modules of a plurality of HW modules, wherein each HW module of the plurality of HW modules operates at a clock frequency, and wherein the clock frequency is dynamic for each HW module;
change the clock frequency of at least one HW module of the plurality of HW modules, wherein identifying the bottleneck comprises identifying which HW module of the plurality of HW modules has a slowest handling time of one flash memory unit (FMU); and
monitor the plurality of HW modules for bottleneck issues.

8. The data storage device of claim 7, wherein the processor is further programmed to:
determine a number of messages pending in an input queue of the plurality of HW modules; and
determine which HW module has a smallest amount of messages in the input queue.

9. The data storage device of claim 8, wherein the processor is further programmed to:
set a clock frequency for a first HW module of the plurality of HW modules to a first clock frequency setting; and
set a clock frequency for a second HW module of the plurality of HW modules to a second clock frequency setting, wherein the second clock frequency setting is lower than the first clock frequency setting.

10. The data storage device of claim 9, wherein the processor is further programmed to repeat:
the determining the number of messages,
the setting the clock frequency for the first HW module, and
the setting the clock frequency for the second HW module, wherein the repeating occurs after a predetermined period of time.

11. The data storage device of claim 10, wherein the processor is further programmed to determine a product of the number of messages and a handling time for each operation requested by the message.

12. The data storage device of claim 11, wherein the first HW module is a HW module with a highest product compared to all other HW modules of the plurality of HW modules.

13. The data storage device of claim 12, wherein the second HW module is a HW module with a lowest product compared to all other HW modules of the plurality of HW modules.

14. The data storage device of claim 9, wherein setting the clock frequency for the second HW module comprises lowering the clock frequency of the second HW module by a percentage based on a current number of messages in the input queue divided by a maximum number of messages permitted in the input queue.

15. A data storage device, comprising:
a memory device; and
a controller coupled to the memory device, wherein the controller comprises a processor programmed to:
identify a bottleneck in one or more hardware (HW) modules of a plurality of HW modules, wherein each HW module of the plurality of HW modules operates at a clock frequency, and wherein the clock frequency is dynamic for each HW module;
change the clock frequency of at least one HW module of the plurality of HW modules, wherein identifying the bottleneck comprises identifying which HW module of the plurality of HW modules has a highest number of a product of a number of messages in an input queue of the respective HW module times a processing time for each message in the input queue; and
monitor the plurality of HW modules for bottleneck issues.

16. A data storage device, comprising:
memory means; and
a controller coupled to the memory means, wherein the controller comprises a processor programmed to:
dynamically change a clock frequency of one or more hardware (HW) modules of a plurality of HW modules based upon detected bottlenecking in the plurality of HW modules, wherein dynamically changing the clock frequency comprises:
increasing the clock frequency of a first HW module of the plurality of HW modules; and
setting the clock frequency of a second HW module of the plurality of HW modules to match the changed clock frequency of the first HW module, wherein the second HW module is a sub-module of the first HW module; and
monitor a number of messages in an input queue of each HW module of the plurality of HW modules.

17. The data storage device of claim 16, wherein the dynamically changing further comprises increasing the clock frequency of a slowest HW module of the plurality of HW modules and another HW module of the plurality of HW modules.

* * * * *